(12) United States Patent
Pei

(10) Patent No.: US 8,312,636 B1
(45) Date of Patent: Nov. 20, 2012

(54) DIAMETER MEASURING DEVICE

(75) Inventor: Shao-Kai Pei, New Taipei (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/198,735

(22) Filed: Aug. 5, 2011

(30) Foreign Application Priority Data

Jun. 22, 2011 (TW) .................................. 10121797

(51) Int. Cl.
*G01B 5/08* (2006.01)

(52) U.S. Cl. ........................................................ 33/555.3

(58) Field of Classification Search ................. 33/555.1, 33/555.2, 555.3, 555.4
See application file for complete search history.

(56) References Cited

U.S. PATENT DOCUMENTS 2,671,272 A * 3/1954 Bishop ......................... 33/555.1
2002/0011005 A1 * 1/2002 Takahashi ..................... 33/555.1
2002/0050069 A1 * 5/2002 Mellander ..................... 33/555.1
2010/0107432 A1 * 5/2010 Lutze ............................ 33/555.1

* cited by examiner

*Primary Examiner* — G. Bradley Bennett
(74) *Attorney, Agent, or Firm* — Altis Law Group, Inc.

(57) ABSTRACT

A rotary disk is provided. The rotary disk defines a receiving groove and includes a curved ruler. The receiving groove is configured for receiving a circular workpiece of which a diameter is to be measured. The rotary disk is configured to be rotated so as to slide the workpiece in the receiving groove until the workpiece is held in place by tight contacts between the workpiece and the rotary disk. The curved ruler includes a number of graduations arranged along a periphery of the receiving groove and configured for indicating the diameter of the workpiece when the workpiece is held in place by a contact point between the workpiece and the rotary disk corresponding to a graduation.

14 Claims, 4 Drawing Sheets

DIAMETER MEASURING DEVICE

BACKGROUND

1. Technical Field

The present disclosure relates to measuring devices and, particularly, to a measuring device for measuring diameters.

2. Description of Related Art

Lens modules include a lens barrel and optical elements, such as lenses, optical filters, or spacers, held in the lens barrel. To ensure that the optical elements can be fittingly held in the lens barrel, the optical elements need to be precisely ground to matching diameter of the inside of the barrel, which requires the ability to efficiently take accurate measurements. However, the current use of vernier calipers, is neither convenient nor efficient.

Therefore, it is desirable to provide a measuring device, which can overcome the limitations described.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will now be described in detail with reference to the drawings.

Figure 1:
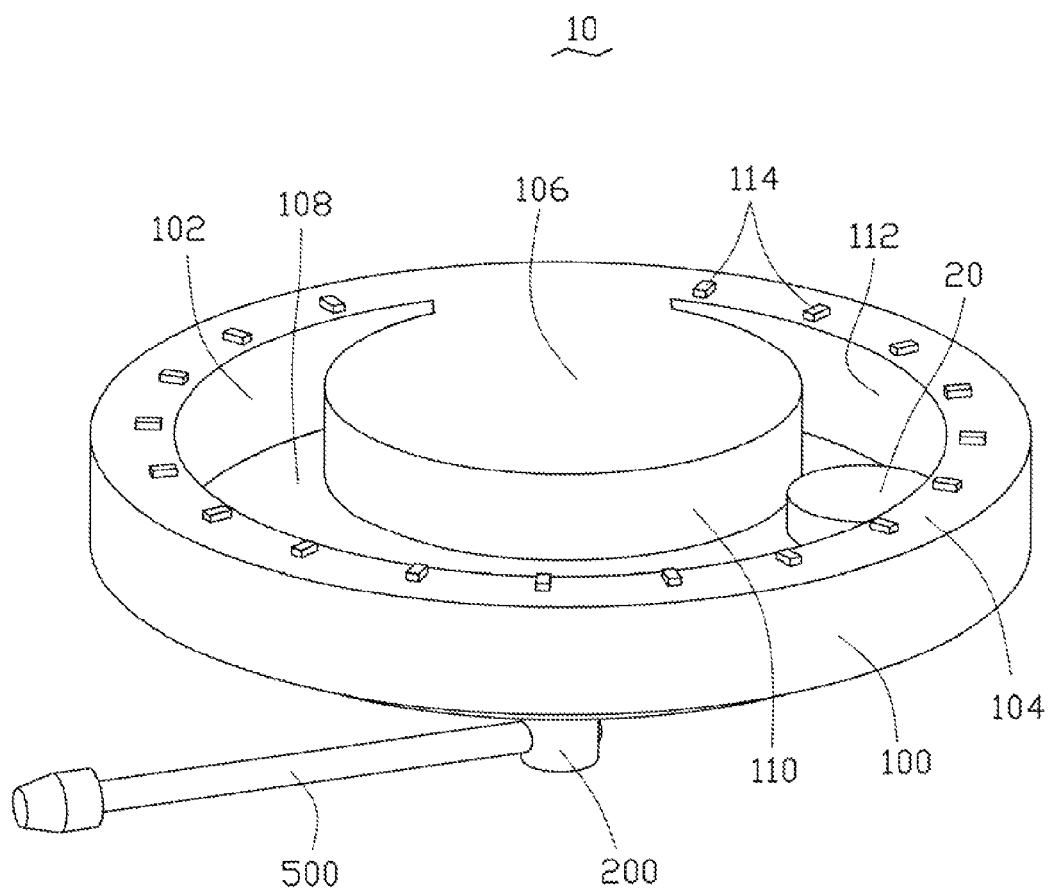
FIG. 1 is an isometric and schematic view of a diameter measuring device, according to an embodiment.
Figure 2:
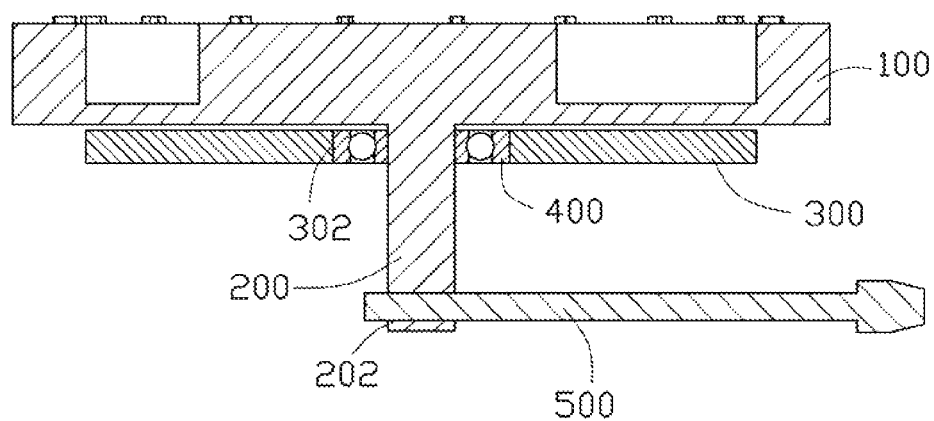
FIG. 2 is a cross-sectional and schematic view of the diameter measuring device, taken along a line II-II of FIG. 1.
Figure 3:
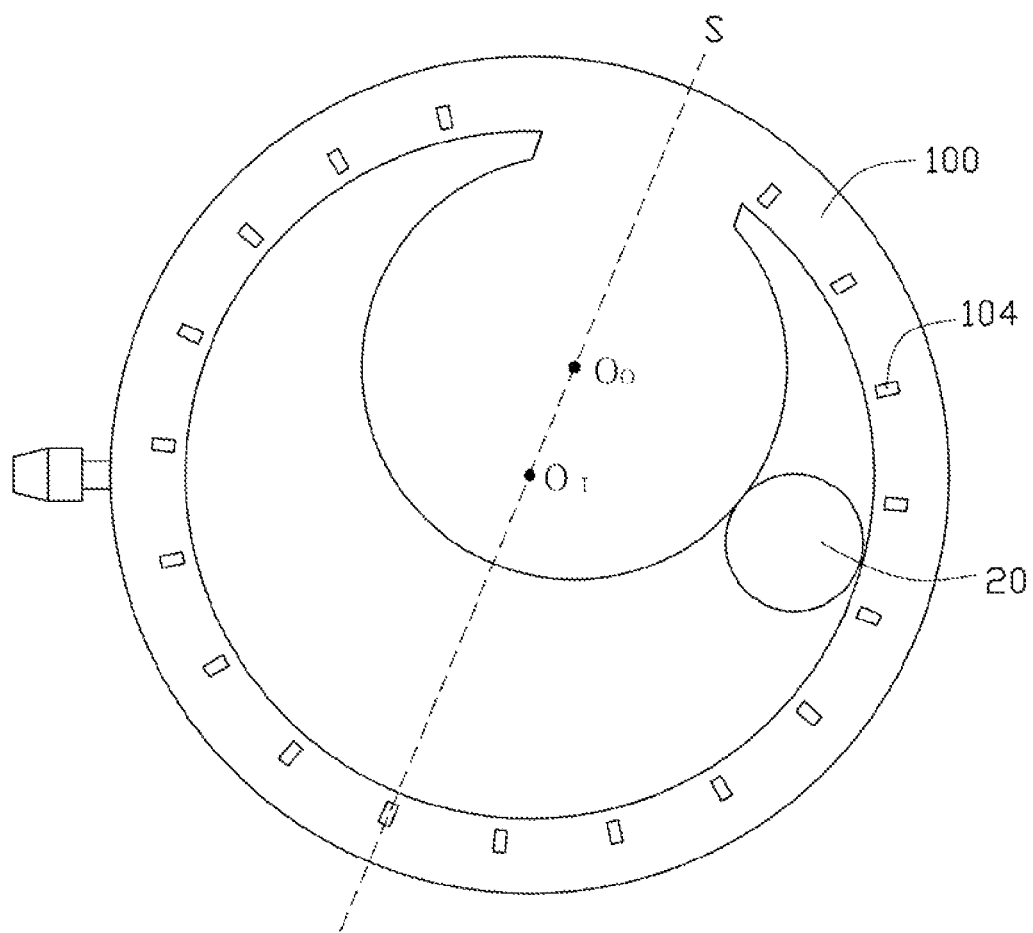
FIG. 3 is a planar and schematic view of the diameter measuring device of FIG. 1.

Referring to FIGS. 1-3, a diameter measuring device 10, according to an embodiment, includes a rotary disk 100. The rotary disk 100 forms a crescent shaped receiving groove 102 and a curved ruler 104. The receiving groove 102 is configured for receiving a circular workpiece 20 of which a diameter is to be measured. The rotary disk 100 is configured to be rotated to slide the workpiece 20 in the receiving groove 102 until the workpiece 20 is held in place in the receiving groove 102 by tight contact between the workpiece 20 and the rotary disk 100. The curved ruler 104 has a number of graduations 114 arranged along a periphery of the receiving groove 102 and is configured for indicating the diameter of the workpiece 20 when the workpiece 20 is held in place by a graduation 114 corresponding to a contact point between the workpiece 20 and the rotary disk 100.

As such, the diameter of the workpiece 20 can be conveniently and efficiently measured by: placing the workpiece 20 into the receiving groove 102; rotating the rotary disk 100 to slide the workpiece 20 in the receiving groove 102 until the workpiece 20 is held in place in the receiving groove 102; and reading the diameter of the workpiece 20 on the graduation 114 corresponding to the contact point between the workpiece 20 and the rotary disk 100.

The rotary disk 100 includes an indication surface 106. The receiving groove 102 and the curved ruler 104 are formed in the indication surface 106.

The receiving groove 102 is bounded by a crescent shaped bottom surface 108, an outer circumferential surface 110, and an inner circumferential surface 112. The outer circumferential surface 110 and the inner circumferential surface 112 uprightly extend up from the periphery of the bottom surface 108. The inner circumferential surface 112 has a diameter greater than that of the outer circumferential surface 110. The inner circumferential surface 112 surrounds the outer circumferential surface 110. A central axis $O_o$ of the outer circumferential surface 110 deviates from a central axis $O_I$ of the inner circumferential surface 112.

In this embodiment, the graduations 114 are arranged along the outer periphery of the receiving groove 102, that is, the graduations 114 are adjacent to the inner circumferential surface 112. Each graduation 114 can be arranged on the indication surface 106 by: providing a standard workpiece (not shown) having a diameter, such as 12 mm, corresponding to the graduation 114 to be arranged and for indicating, such as 12 mm; placing the standard workpiece into the receiving groove 102; rotating the rotary disk 100 to slide the standard workpiece in the receiving groove 102 until the standard workpiece is held in place; arranging the graduation 114 on the indication surface 106 in a vicinity of a contact point between the standard workpiece and the inner circumferential surface 112 such that the graduation 114 points to the contact point. The graduations 114 are symmetrical about a common symmetric axis S of the outer circumferential surface 110 and the inner circumferential surface 112.

The rotary disk 100 is circular. The diameter measuring device 10 includes a rotary shaft 200 uprightly extending from a surface of the rotary disk 100 opposing the indication surface 106. To efficiently cause the workpiece 20 to slide, the rotary shaft 200 is arranged along the central axis of the inner circumferential surface 112.

The diameter measuring device 10 further includes a support plate 300 which can be a portion of a platform. The support plate 300 defines a through hole 302 corresponding to the rotary shaft 200. The rotary shaft 200 rotatably inserts through the through hole 302. As such, the rotary disk 100 is rotatably supported above the support plate 300.

The diameter measuring device 10 also includes a bearing 400. The bearing 400 is set in the through hole 302, and the rotary shaft 200 is connected to the support plate 300 via the bearing 400 to reduce friction between the rotary disk 100 and the support plate 300. The rotary disk 100 is spaced away from the support plate 300 to further reduce the friction between the rotary disk 100 and the support plate 300.

The rotary shaft 200 defines an assembly hole 202 at an end thereof distant from the rotary disk 100. The diameter measuring device 10 further includes a handle 500. The handle 500 is installed in the assembly hole 202 and is operable to rotate the rotary disk 100.

In other embodiments, the rotary shaft 200, the bearing 400, and/or the handle 500 can be omitted. The rotary disk 100 can directly be supported by and rotates on the support plate 300. Also, the rotary disk 100 can be supported by other device in other embodiments.

Figure 4:
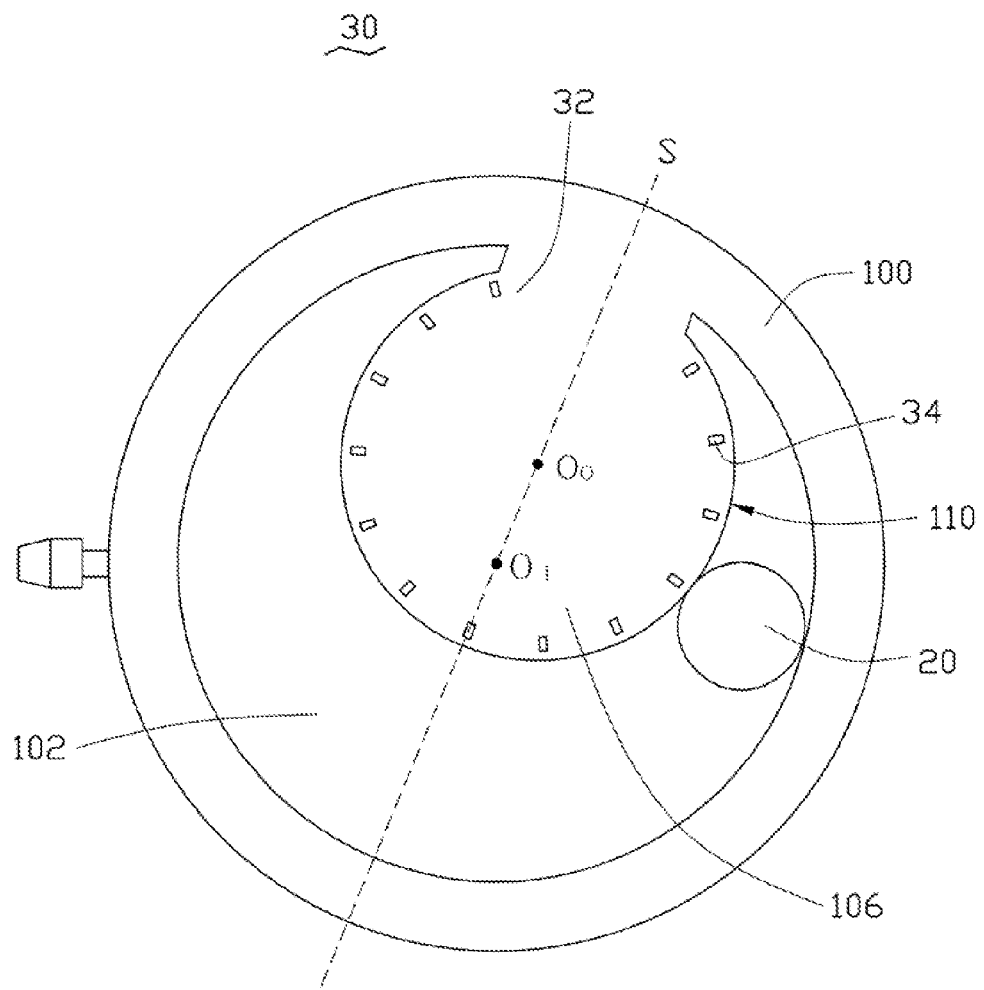
FIG. 4 is an isometric and schematic view of a diameter measuring device, according to another embodiment.

Referring to FIG. 4, a diameter measuring device 30 is essentially similar to the diameter measuring device 10, except that: the diameter measuring device 30 includes a curved ruler 32 having a number of graduations 34 arranged along the inner periphery of the receiving groove 102, that is, the graduations 34 are close to the outer circumferential surface 110. Each graduation 34 is arranged on the indication surface 106 by: providing a standard workpiece of a diameter corresponding to the graduation 34 to be arranged, for example, providing a standard workpiece of a diameter 12 mm corresponding to the graduation 114 for indicating 12 mm; placing the standard workpiece into the receiving groove 102; rotating the rotary disk 100 until the standard workpiece is held in place; arranging the graduation 114 on the indication surface 106 in a neighborhood of a contact point between the standard workpiece and the outer circumferential surface 110 such that the indication 114 points to the contact point. The graduations 34 are symmetrical about a common symmetric axis of the outer circumferential surface 110 and the inner circumferential surface 112 too.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. A diameter measuring device comprising:
    a rotary disk defining a crescent shaped receiving groove, and comprising a curved ruler;
    wherein the receiving groove is configured for receiving a circular workpiece of which a diameter is to be measured, the rotary disk is configured to be rotated so as to slide the workpiece in the receiving groove until the workpiece is held in place by tight contacts between the workpiece and the rotary disk, and the curved ruler comprises a plurality of graduations arranged along a periphery of the receiving groove and configured for indicating the diameter of the workpiece when the workpiece is held in place using a graduation corresponding to a contact point between the workpiece and the rotary disk.

2. The diameter measuring device of claim 1, wherein the rotary disk comprises an indication surface, the receiving groove is defined in the indication surface, and the curved ruler is positioned on the indication surface.

3. The diameter measuring device of claim 1, wherein the receiving groove is bounded by a crescent shaped bottom surface, an outer circumferential surface, and an inner circumferential surface, the outer circumferential surface and the inner circumferential surface uprightly extend up from the peripheries of the bottom surface, the inner circumferential surface has a diameter greater than that of the outer circumferential surface and thus surrounds the outer circumferential surface, and a central axis of the outer circumferential surface deviates from that of the inner circumferential surface.

4. The diameter measuring device of claim 3, wherein the graduations are arranged adjacent to the inner circumferential surface.

5. The diameter measuring device of claim 4, wherein each graduation is arranged by:
    providing a standard workpiece of a diameter corresponding to the graduation;
    placing the standard workpiece into the receiving groove;
    rotating the rotary disk until the standard workpiece is held in place; and
    arranging the graduation in a vicinity of a contact point between the standard workpiece and the inner circumferential surface such that the graduation points to the contact point.

6. The diameter measuring device of claim 4, wherein the graduations are symmetrical about a common symmetric axis of the outer circumferential surface and the inner circumferential surface.

7. The diameter measuring device of claim 3, wherein the graduation are arranged adjacent to the outer circumferential surface.

8. The diameter measuring device of claim 7, wherein each graduation is arranged by:
    providing a standard workpiece of a diameter corresponding to the graduation;
    placing the standard workpiece into the receiving groove;
    rotating the rotary disk until the standard workpiece is held in place; and
    arranging the graduation in a vicinity of a contact point between the standard workpiece and the outer circumferential surface such that the graduation points to the contact point.

9. The diameter measuring device of claim 1, further comprising a rotary shaft extending from a surface of the rotary disk opposing the indication surface.

10. The diameter measuring device of claim 9, wherein the rotary shaft is arranged along a central axis of the inner circumferential surface.

11. The diameter measuring device further of claim 9, further comprising a support plate, wherein the support plate defines a through hole, and the rotary shaft rotatably inserts through the through hole.

12. The diameter measuring device of claim 11, further comprising a bearing, the bearing being set in the through hole, the rotary shaft being connected to the support plate via the bearing.

13. The diameter measuring device of claim 12, wherein the rotary disk and the support plate are spaced away from each other.

14. The diameter measuring device of claim 9, wherein the rotary shaft defines an assembly hole in an end distant from the rotary disk, and the diameter measuring device further comprises a handle installed into the assembly hole.

* * * * *

UNITED STATES PATENT AND TRADEMARK OFFICE
CERTIFICATE OF CORRECTION

PATENT NO. : 8,312,636 B1  
APPLICATION NO. : 13/198735  
DATED : November 20, 2012  
INVENTOR(S) : Shao-Kai Pei Page 1 of 1

It is certified that error appears in the above-identified patent and that said Letters Patent is hereby corrected as shown below:

On the Title Page

Please replace Item (30) regarding "Foreign Application Priority Data" with the following:

(30)    Foreign Application Priority Data

June 22, 2011    (TW) ................100121797

Signed and Sealed this
Twenty-fourth Day of December, 2013

Margaret A. Focarino
*Commissioner for Patents of the United States Patent and Trademark Office*